(12) United States Patent
Marimon et al.

(10) Patent No.: US 7,500,637 B2
(45) Date of Patent: Mar. 10, 2009

(54) AIRSHIP WITH LIFTING GAS CELL SYSTEM

(75) Inventors: Thomas L. Marimon, Silver Lake, OH (US); Gordon S. Schmidt, North Canton, OH (US); Dennis L. Carter, Hudson, OH (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/241,336

(22) Filed: Sep. 30, 2005

(65) Prior Publication Data

US 2007/0075186 A1  Apr. 5, 2007

(51) Int. Cl.
B64B 1/02 (2006.01)
B64B 1/58 (2006.01)

(52) U.S. Cl. .......................... 244/30; 244/128
(58) Field of Classification Search ................. 244/125, 244/126, 128, 24–33, 127
See application file for complete search history.

(56) References Cited

U.S. PATENT DOCUMENTS

| | | | | |
|---|---|---|---|---|
| 1,254,399 A * | 1/1918 | Forlanini | ..................... | 244/125 |
| 1,503,386 A * | 7/1924 | Stahl | ..................... | 244/100 A |
| 1,762,845 A * | 6/1930 | Upson | ..................... | 244/125 |
| 1,763,835 A * | 6/1930 | Upson | ..................... | 244/30 |
| 1,860,555 A * | 5/1932 | Schlosser | ..................... | 244/128 |
| 1,949,304 A * | 2/1934 | Hardin | ..................... | 244/2 |
| 2,020,526 A * | 11/1935 | Stahl | ..................... | 244/29 |
| 2,197,568 A * | 4/1940 | Donnell | ..................... | 244/125 |
| 2,382,817 A * | 8/1945 | Reiss | ..................... | 244/5 |
| 2,451,815 A * | 10/1948 | Donnell et al. | ................. | 244/96 |
| 3,079,106 A * | 2/1963 | Whitnah | ..................... | 244/30 |
| 3,129,911 A * | 4/1964 | Fitzpatrick | ................... | 244/125 |
| 3,185,411 A * | 5/1965 | Gembe | ..................... | 244/30 |
| 3,225,208 A * | 12/1965 | Wolfe | ..................... | 307/43 |
| 3,268,184 A * | 8/1966 | Biggar et al. | ............ | 244/158.3 |
| 3,276,726 A * | 10/1966 | Webb | ..................... | 244/31 |
| 3,456,903 A * | 7/1969 | Papst | ..................... | 244/30 |
| 3,620,485 A | 11/1971 | Gelhard | ..................... | 244/29 |
| 3,706,433 A * | 12/1972 | Sonstegaard | ................ | 244/128 |
| 3,972,492 A | 8/1976 | Milne | ..................... | 244/30 |
| 4,032,085 A * | 6/1977 | Papst | ..................... | 244/30 |
| 4,773,617 A | 9/1988 | McCampbell | ................ | 244/24 |
| 4,995,572 A * | 2/1991 | Piasecki | ..................... | 244/2 |
| 5,041,047 A * | 8/1991 | Casale | ..................... | 446/220 |
| 5,348,251 A * | 9/1994 | Ferguson | ..................... | 244/30 |
| 5,352,493 A * | 10/1994 | Dorfman et al. | ............ | 427/530 |
| 5,890,676 A | 4/1999 | Coleman et al. | ............ | 244/128 |
| 6,009,789 A * | 1/2000 | Lyons | ..................... | 89/36.02 |
| 6,382,557 B1 * | 5/2002 | Lafuma et al. | ............. | 244/12.2 |
| 6,427,943 B2 * | 8/2002 | Yokomaku et al. | ............ | 244/30 |
| 6,536,712 B1 * | 3/2003 | Barenett | ................... | 244/158.3 |

(Continued)

*Primary Examiner*—Michael R Mansen
*Assistant Examiner*—Joseph W Sanderson
(74) *Attorney, Agent, or Firm*—Renner Kenner Greive Bobak Taylor & Weber (57) ABSTRACT

An airship with a lifting gas cell system comprises an airship that contains a plurality of partitions and a plurality of diaphragms, wherein the partitions and diaphragms are configured to form a number of gas cells that contain a lifting gas such as helium, and a single air cell that contains air. As a result, during the ascent and descent of the airship the number of gas cells ensures that the lifting gas is uniformly distributed over the entire length of the airship, whereas the air cell allows a large amount of air to be retained during a descent.

13 Claims, 5 Drawing Sheets

U.S. PATENT DOCUMENTS

| | | | |
|---|---|---|---|
| 6,568,640 B1 * | 5/2003 | Barnett | 244/158.3 |
| 6,609,680 B2 | 8/2003 | Perry et al. | 244/30 |
| 6,648,272 B1 | 11/2003 | Kothmann | 244/97 |
| 6,698,686 B2 * | 3/2004 | Ogawa et al. | 244/96 |
| 6,708,922 B1 * | 3/2004 | Hamilton | 244/30 |
| 6,739,549 B2 * | 5/2004 | Senepart | 244/30 |
| 6,786,456 B2 * | 9/2004 | Veal et al. | 244/158.3 |
| 6,811,115 B2 | 11/2004 | Kurose | 244/97 |
| 2003/0010870 A1 * | 1/2003 | Chafer | 244/172 |
| 2003/0146345 A1 * | 8/2003 | Ogawa et al. | 244/96 |
| 2004/0018749 A1 * | 1/2004 | Dorfman | 438/783 |
| 2005/0163985 A1 * | 7/2005 | Dorfman | 428/216 |
| 2005/0173591 A1 * | 8/2005 | Colting | 244/26 |
| 2005/0211845 A1 * | 9/2005 | Perry et al. | 244/125 |
| 2006/0157617 A1 * | 7/2006 | Perry et al. | 244/97 |
| 2007/0069077 A1 * | 3/2007 | Colting | 244/128 |

* cited by examiner

AIRSHIP WITH LIFTING GAS CELL SYSTEM

TECHNICAL FIELD

Generally, the present invention relates to high altitude airships. More specifically, the present invention relates to lifting gas cells used to isolate discrete portions of lifting gas along a length of the high altitude airship. Particularly, the present invention relates to lightweight lifting gas cells that have flexible diaphragms and partitions.

BACKGROUND

Non-rigid airships in general use a lifting gas, such as helium, and air to allow for the ascent and descent of the airship while maintaining a higher gas pressure on the inside of the airship than on the outside of the airship. Because the interaction or mixing of the lifting gas and air is unwanted, techniques aimed at separating the lifting gas from the air have been developed and have been successful with respect to conventional airships that do not attain high altitude (high altitude generally being considered 40,000 ft. and above). However, utilizing such conventional methods in a high altitude airship suffers from several drawbacks.

Figure 1A:
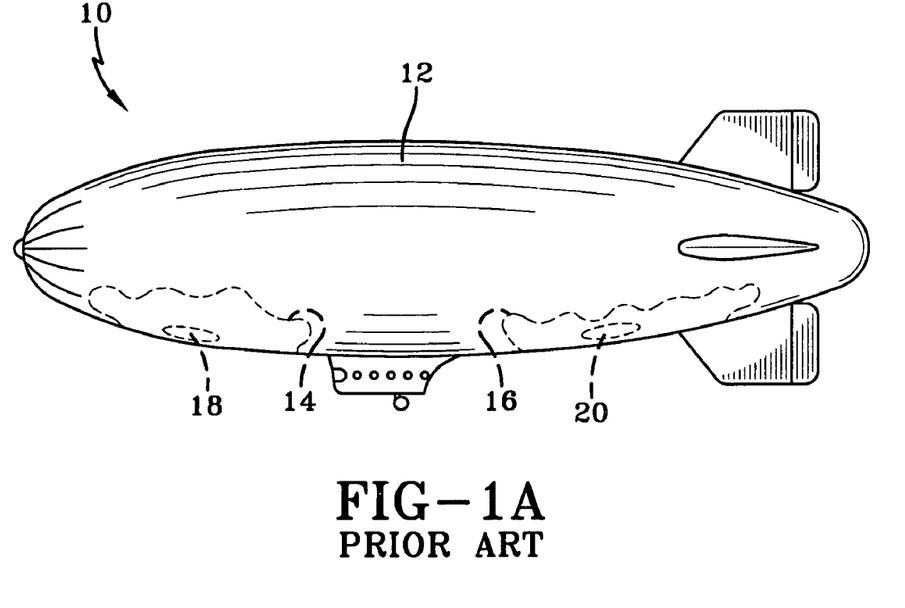
FIG. 1A shows an elevational view of a prior art airship during ascent utilizing a conventional ballonet system.
Figure 1B:
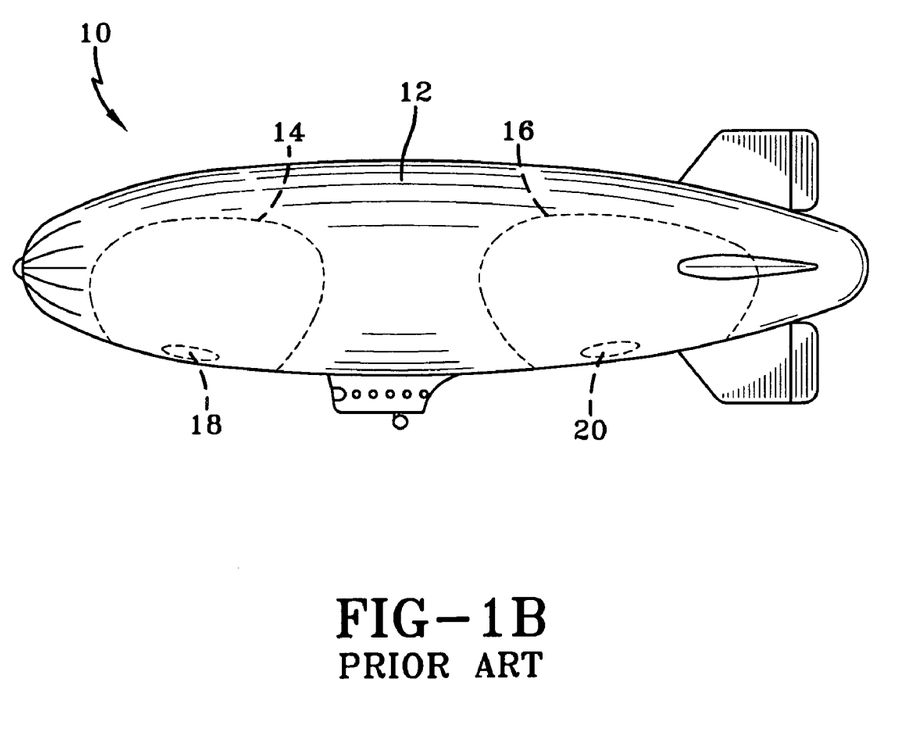
FIG. 1B shows an elevational view of the prior art airship during descent utilizing a conventional ballonet system.

A conventional, non-rigid airship 10 that does not ascend to high altitudes, as shown in FIGS. 1A and 1B, typically comprises a hull or envelope 12 within which a number of ballonets 14,16 are disposed. The ballonets 14,16 are holding balloons that are made from a flexible, impermeable material that are attached to the interior of the envelope 12 of the airship 10, and are utilized to store and separate air from the helium held within the remaining portion of the envelope 12. As the airship 10 ascends to altitude, the air stored in each ballonet 14,16 is exhausted through a number of valve/blowers 18,20, causing the ballonets 14,16 to deflate, as shown in FIG. 1A. The helium within the envelope 12 expands while the airship 10 ascends to the desired altitude. It will be appreciated that expansion of the helium also forces air out of the ballonets. Resultantly, during the deflation of the ballonets 14,16, the material comprising the ballonets 14,16 tends to collapse and bunch so as to take on an unsymmetrical orientation with respect to the envelope 12.

In order to maintain pressure during descent, air is forced back into each ballonet 14,16 using the valve/blowers 18,20 causing the ballonets 14,16 to inflate, as shown in FIG. 1B. Thus, it should be clear that the material comprising the ballonets 14,16 traverses, or moves from a deflated condition to an inflated condition as air is blown into the ballonets 14,16. Likewise, the material comprising the ballonets moves from an inflated to a deflated condition as air is pushed out of the ballonets 14,16.

High altitude airships are structures that resemble conventional airships, but may be significantly larger. For example, the hull or envelope of a high altitude airship may comprise a volume of several million cubic feet. Due to the large variation in pressure and temperature that occurs as the high altitude airship moves from ground to high altitude and vice versa, it is required that the helium within the high altitude airship expand to a greater degree than that required by conventional airships. Additionally, a high altitude airship requires that a larger amount of air be expelled from its envelope than that of conventional airships. As such, to ascend the high altitude airship to a high altitude, large ballonets would be required to accommodate the large quantity of lifting gas expansion that would occur within the envelope of the high altitude airship. Utilizing large ballonets, however, is impractical for high altitude airships because the added weight would act to impede the attainment of high altitudes. Furthermore, because of the increased amount of material needed for the ballonets of a high altitude airship, significant bunching and twisting of the ballonet material would result when the ballonets are deflated, thus leading to an imbalanced condition within the envelope. The balance of the high altitude airship would be further hampered as the lifting gas would be free to accumulate in any region within the hull or envelope of the airship making it difficult to maintain control of the airship. For example, if the lifting gas accumulates toward the aft portion of the airship, this would cause the airship to become nose heavy, making it difficult to fly or to ascend.

Therefore, there is a need for a lifting gas cell system that can accommodate the large expansion and contraction of the lifting gas that will occur inside a high altitude airship. Additionally, there is a need for a lifting gas cell system for a high altitude airship that is lightweight. Still yet, there is a need for a lifting gas cell system that provides a plurality of cells to distribute the lifting gas evenly along the length of the hull of the airship, to maintain the balance, stability, and control of the airship.

SUMMARY OF THE INVENTION

In light of the foregoing, it is a first aspect of the present invention to provide an airship with a lifting gas cell system.

It is another aspect of the present invention to provide an airship comprising an envelope having a width orientation and a length orientation, at least one partition having a partition outer edge attached anywhere along a portion of the width orientation and a partition inner edge, and at least two diaphragms having opposed diaphragm outer edges connected to one another by opposed diaphragm inner edges, wherein the diaphragm outer edges are attached anywhere along the length orientation, and the diaphragm inner edges are attached to the partition inner edges.

Yet another aspect of the present invention is to provide an airship comprising an envelope having an interior surface, at least one partition substantially vertically disposed within and attached to the envelope, and a diaphragm disposed on each side of the at least one partition, the diaphragm having edges attached to the at least one partition and to the interior surface, wherein the at least one partition, the diaphragms and the interior surface define lifting gas cells, and wherein the diaphragm and the interior surface define an air cell.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 2:
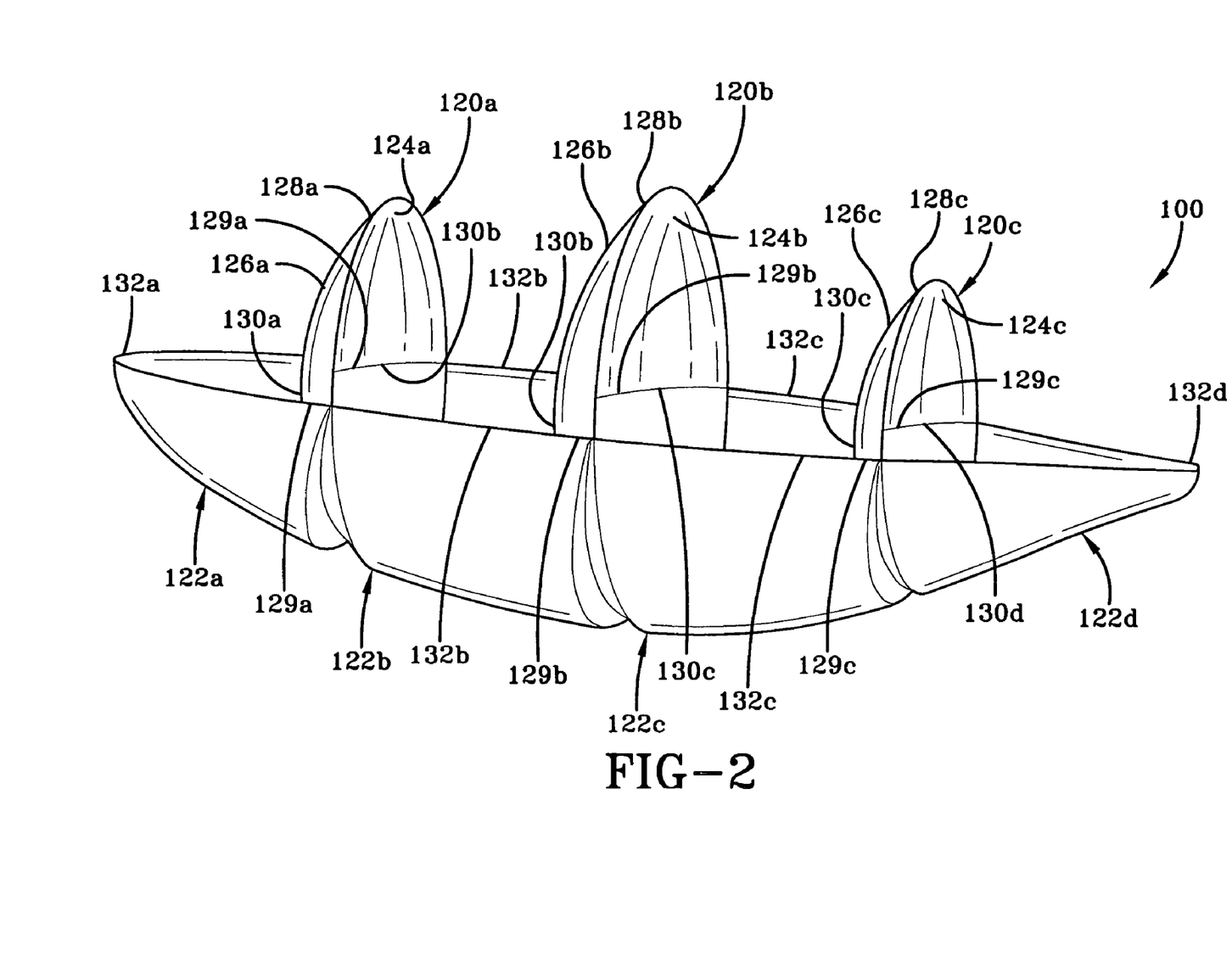
FIG. 2 is a perspective view of the lifting gas cell system removed from the airship in accordance with the concepts of the present invention, wherein the various diaphragms and partitions comprising the lifting gas cell system are shown.
Figure 3:
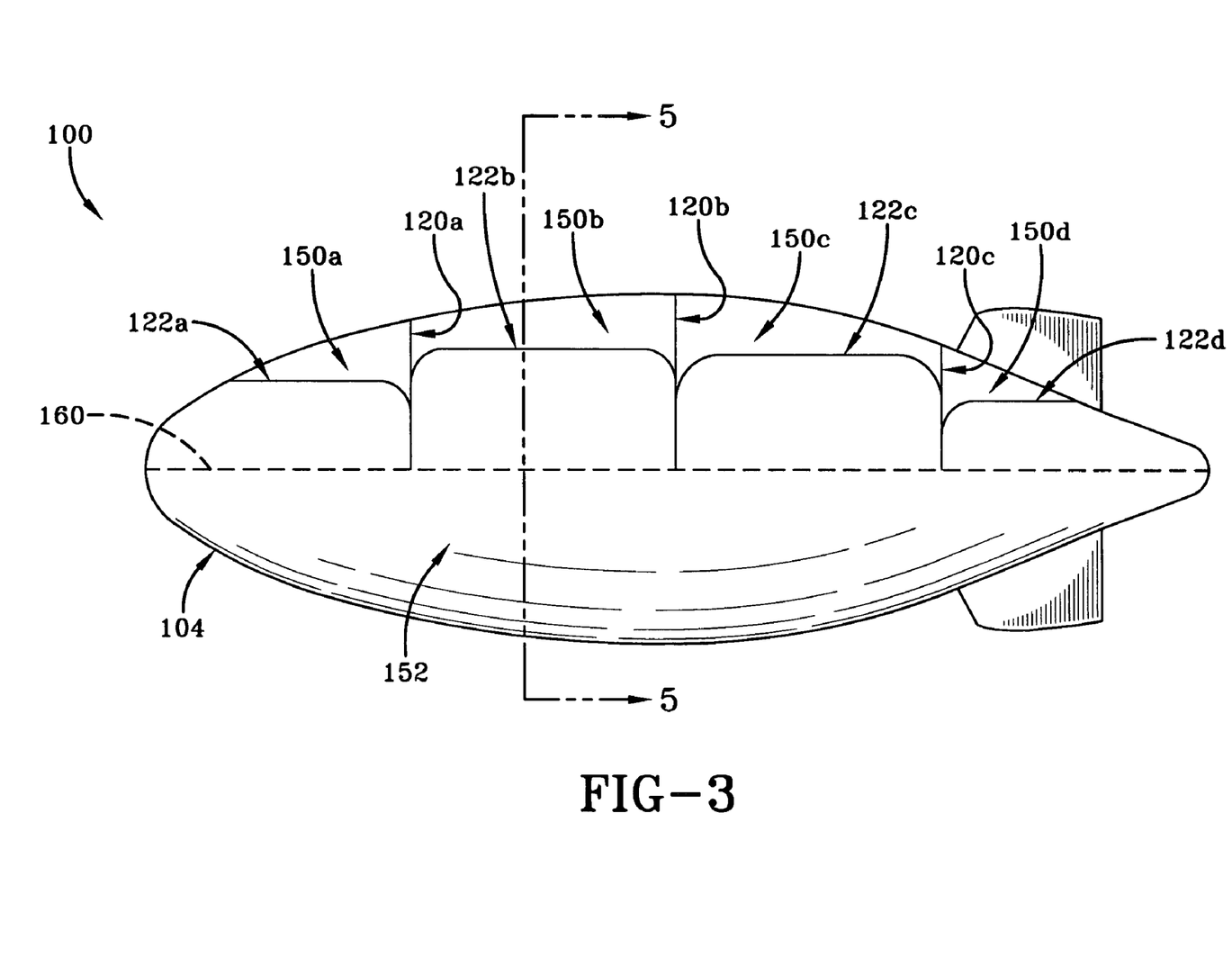
FIG. 3 is a cross-sectional view of the airship and the lifting gas cell system of the present invention at ground level.
Figure 4:
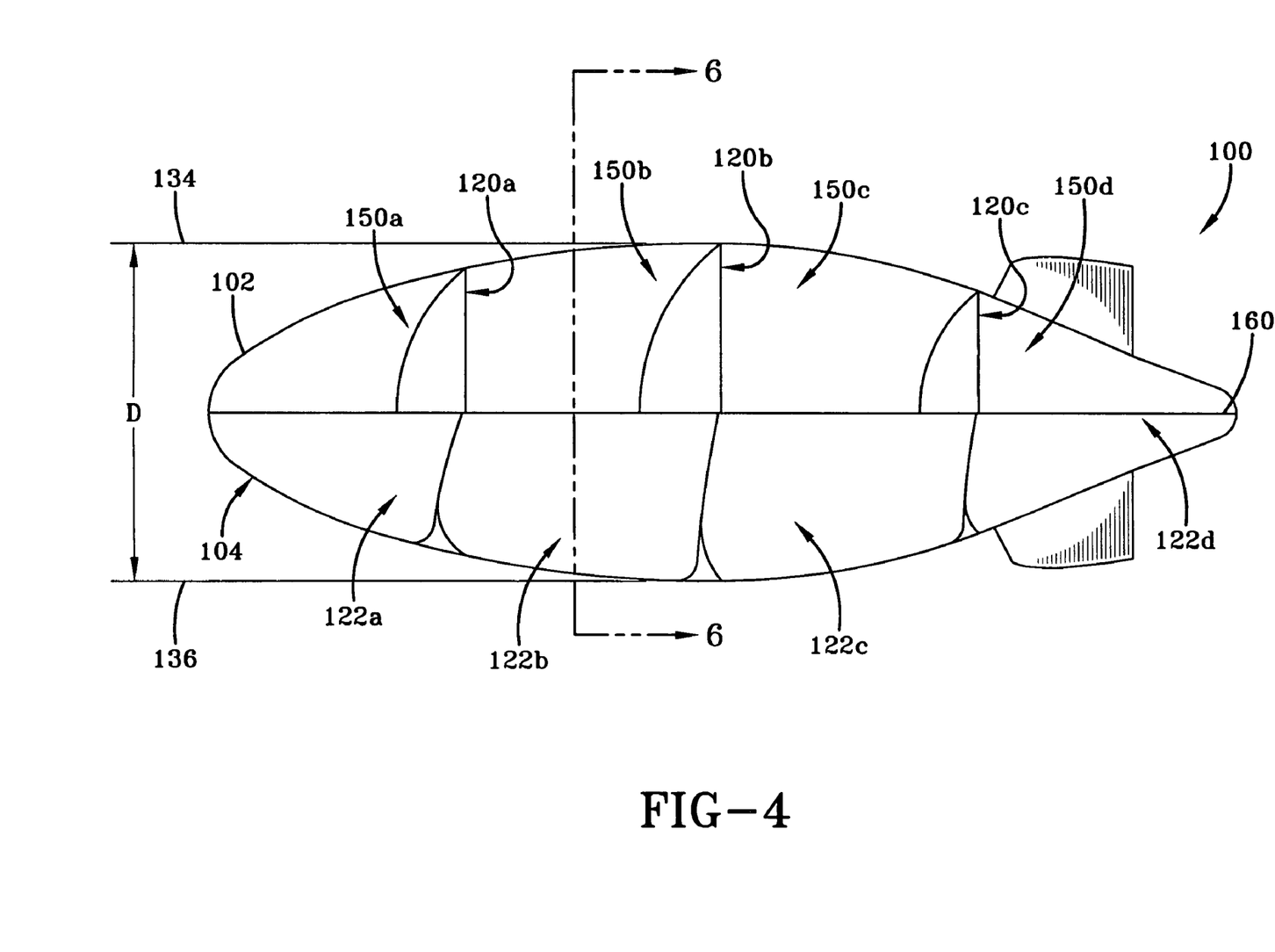
FIG. 4 is a cross sectional view of the airship and lifting gas cell system according to the concepts of the present invention at altitude.

A lifting gas cell system in accordance with the concepts of the present invention is generally designated by the numeral 100, as shown in FIGS. 2, 3, and 4 of the drawings. Although the present invention 100 is compatible with conventional airships, such as blimps, aerostats, or other lighter-than-air vehicles, the present discussion relates to its use with high altitude airships.

As best seen in FIGS. 3 and 4, the lifting gas cell system 100 discussed below is designed for use with an envelope 102 for an airship 104. The system 100 accommodates the expansion and contraction of the various gases that are disposed within the envelope 102 to allow the airship 104 to ascend and descend in a controlled manner. The envelope 102 is formed from a flexible laminate material made to withstand operation at high altitudes and exposure to elements associated therewith. An exemplary laminate material is disclosed in U.S. patent application Ser. No. 10/388,772 and incorporated herein by reference. The envelope 102 may be internally supported by various types of support structures or cells to be discussed. In any event, the envelope 102 contains a lifting gas such as helium that allows the airship 104 to ascend to the desired high altitude. And as can be seen from the drawings, the envelope provides a shape having a length and width orientation, wherein the circumference of the envelope is generally more narrow at each end than in the middle.

As best seen in FIG. 2, the lifting gas cell system 100 comprises a plurality of one layer, semi-circular partitions 120 that are separated by diaphragms 122. The partitions 120 are formed from gas impervious material that is flexible, so as to accommodate the expansion and contraction of the internal gases. Each of the partitions 120 include a first surface 124 and a second surface 126, which faces in a direction opposite the first surface, that may be concave and convex respectively. However, it should be appreciated that the first and second surfaces 124,126 may be flat or have any other desired preformed shape or contour. Each partition 120 includes an outer edge 128 that is attached to an interior surface of the envelope 102, and an inner edge 129 that is attached to each adjacent diaphragm 122 in a manner that will be discussed more fully later. In other words, each partition 120 is substantially semi-circular in shape, wherein the somewhat circular portion, identified as the edge 128, is fastened or otherwise secured to an interior surface of the envelope 102. Indeed, the shape of the edge 128 is such that the partition does not contribute any additional stress or strain to the airship when the envelope is pressurized. It will be appreciated that three partitions are shown in this embodiment (120a, 120b and 120c), but that any number of partitions could be used. And components associated with a specific partition have the same alphabetic suffix. For example, the partition 120a includes the first surface 124a, the second surface 126a, an outer edge 128a, and an inner edge 129a. Moreover, the number of partitions corresponds to the number of diaphragms used. Since there are three partitions used in this embodiment, four diaphragms are necessitated. Each diaphragm has an alphabetic suffix a-d, and any component associated with a specific diaphragm has the same suffix.

Each diaphragm 122 includes a respective inner partition edge 130 and an outer envelope edge 132, and are formed from a flexible and pliable material, similar to that used to form the envelope 102 and the partitions. The diaphragms 122a-d are attached to their adjacent inner partition edges 130a-d, via any suitable means including thermo-welding, adhesive, or any other gas impervious attachment means. In other words, the inner edges 130 are those edges of the diaphragms that are attached to inner edges 129 of adjacent partitions. For example, one diaphragm inner edge 130b is attached to partition inner edge 129a at one end and the opposite diaphragm inner edge 130b is attached to partition inner edge 129b. As such, each partition inner edge 129 has two layers of material attached to and extending therefrom. For example, partition inner edge 129b is attached to adjacent diaphragm partition edge 130b and adjacent partition edge 13c. The outer edges 132a-d are attached to the interior surface of the envelope 102 at about a mid-point or somewhat below the mid-point of the envelope along a selected length orientation. For example, one side of outer edge 132b is attached to a port side interior envelope surface, and the other side of outer edge 132b is attached to a starboard side interior envelope surface. The material comprising the diaphragms 122a-d is sized and shaped to allow for substantial traversal of the vertical distance or width orientation defined by the vertical upper and lower extremities 134,136 of the airship 104. This vertical distance is represented by the letter 'D' shown in FIG. 4. In addition to traversing the vertical distance D, the diaphragms 122a-d are sized and shaped to substantially conform to the curvature of at least the lower vertical extremities of the airship 104 when the lighter-than-air gas has fully expanded.

FIGS. 3 and 4 show the lifting gas cell system 100 disposed within the airship 104 to create a plurality of individual lifting gas cells 150a-d, and a single air cell 152. Specifically, to form the gas cells 150a-d, and the air cell 152, the partitions 120a-c and the diaphragms 122a-d are attached at their respective outer edges 128a-c, and 132a-d to the inner surface of the envelope 102. The attachment or interface between the various outer edges, inner edges, and respective interior surfaces of the envelope may be achieved through any gas impermeable means of attachment, including thermo-welding, adhesive, stitching or the like. It should be pointed out that the lifting gas cells 150a-d serve to confine the lifting gas, such as helium, from the air that is contained in the air cell 152. As such, the lifting gas cells 150a-d serve to compartmentalize the lifting gas from the air that spans the length of the envelope 102 within the air cell 152.

As shown clearly in FIG. 3, the partitions 120a-c and the diaphragms 122 may be configured to only extend vertically to a vertical midpoint 160 of the envelope 102. However, in another embodiment of the present gas cell system 100, the partitions 120a-c may be configured to extend any desired vertical distance above or below the vertical midpoint 160 of the airship 104, as long as the partitions 120a-c do not span the entire distance D of envelope 102. It will be appreciated that the partitions are precluded from forming individual compartments in the air cell 152.

The operation of the lifting gas cell system 100 during an ascent and descent will now be discussed in detail. In FIG. 3 the envelope 102 of the airship 104 containing the lifting gas cell system 100 is shown at ground level. Initially, the envelope is pressurized and the air cell 152 is filled with air and the lifting cells 150 are filled with a lighter-than-air gas so that the airship is buoyant at ground level. In this condition, the airship is moored to a ground station until ready for flight. The airship is then released and, during ascent, the air within the air cell 152 will escape from the envelope 102 through valves (not shown) to further allow the lifting gas to expand. As a result of these combined events, the diaphragms 122a-d transition from their position shown in FIG. 3 toward the lower extremity 136 of the envelope 102, as shown in FIG. 4.

To maintain proper pressure of the airship 104 during a descent, air is blown into the envelope 102 using blowers (not shown). During this process the pressure of the air within the air cell 152 increases causing the diaphragms 122a-d to traverse upwardly toward the upper extremity 134 of the envelope 102. Also because of the increased pressure exerted by the air cell 152, the lifting gas disposed in each of the gas cells 150a-d contracts facilitating the upward movement of the diaphragms 122a-d.

Figure 5:
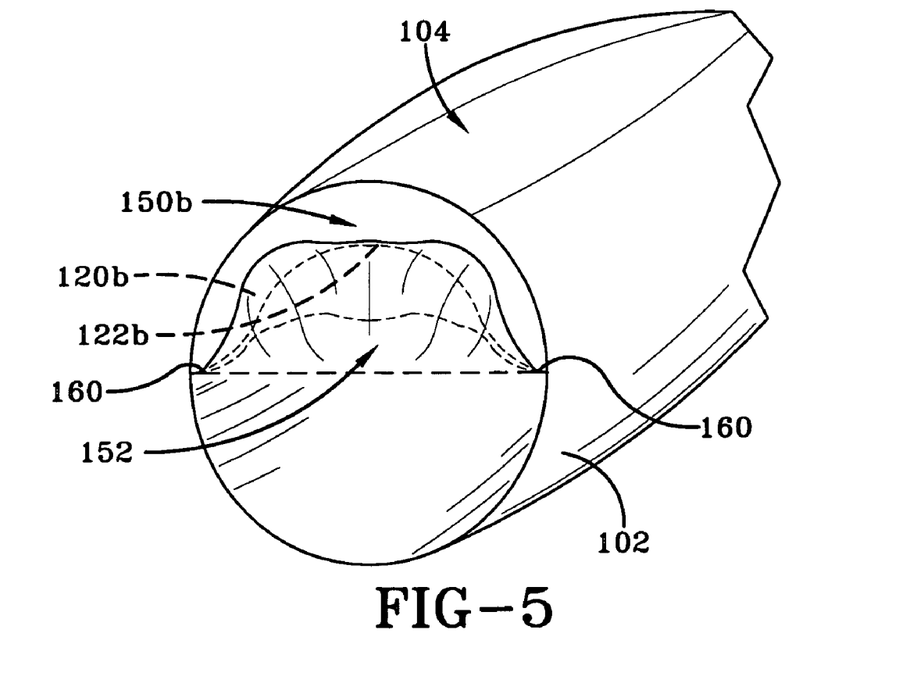
Fig 5 is a perspective cross-sectional view of the airship taken along line 5-5 of FIG. 3 showing the relative position of a diaphragm when the airship is at ground level.

FIG. 5 illustrates the relative position of the diaphragm 122b when the airship 104 is at ground level. The diaphragm 122b serves to separate the lifting gas contained in the gas cell 150b from the air contained in the air cell 152. Furthermore, the upward movement of the diaphragm 122b increases the volume of the air cell 152 while decreasing the volume of the gas cell 150b, thus allowing a large volume of air to be blown into the envelope 102 during a descent of the airship 104.

Figure 6:
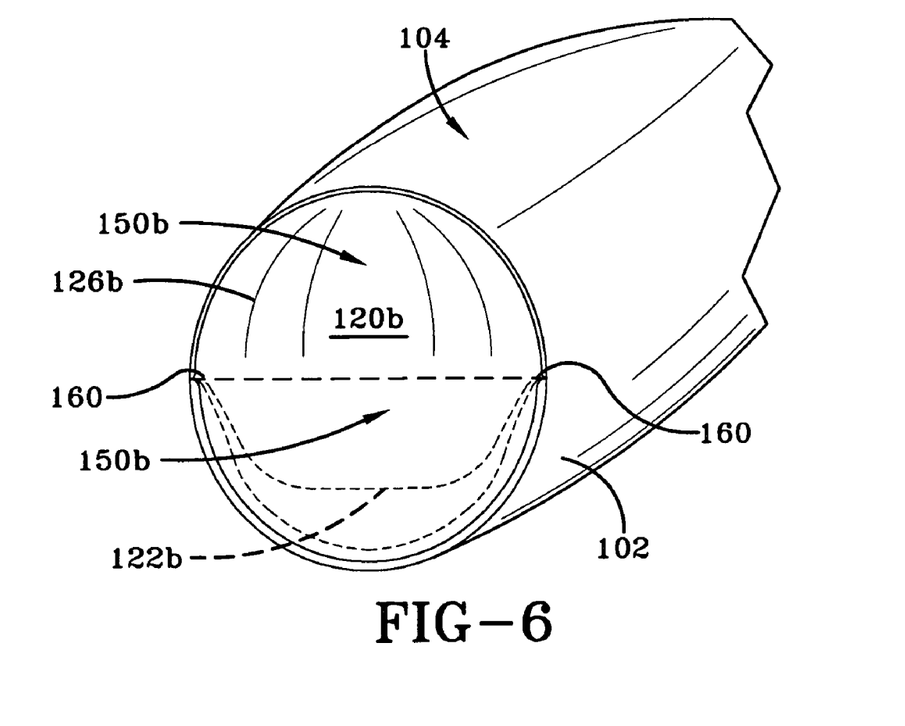
FIG. 6 is a perspective cross-sectional view of the airship taken along line 6-6 of FIG. 4 showing the relative position of the diaphragm when the airship is at altitude.

FIG. 6 illustrates the relative position of the diaphragm 122b when the airship 104 is at altitude. As shown, movement of the diaphragm 122b decreases the volume of the air cell 152, while increasing the volume of the lifting cell 150b, thus allowing the lifting gas to occupy a much larger volume during an ascent of the airship 104.

It will, therefore, be appreciated that one advantage of the present invention is that the diaphragms resist bunching and twisting thus increasing the balance of the airship. Another advantage of the present invention is that the diaphragms and partitions comprise a lightweight system that facilitates an airship's achievement of high altitudes. Yet another advantage of the present invention is that the gas cells separate the lifting gas into discrete quantities thus preventing the lifting gas from accumulating in a single region within the airship.

Although the present invention has been described in considerable detail with reference to certain embodiments, other embodiments are possible. Therefore, the spirit and scope of the appended claims should not be limited to the description of the embodiments contained herein.

What is claimed is:

1. A pressure-stabilized, non-rigid airship, lacking an internal rigid framework, comprising:
    a pressurized gas impervious envelope having an inner surface and an outer surface, said inner surface defined by a width orientation and a length orientation;
    at least one partition having a partition inner edge and a semi-circular partition outer edge, wherein said semi-circular partition outer edge is attached about a semi-circular portion of said inner surface of said pressurized gas impervious envelope, such that said partition spans a partial amount of said width orientation of said pressurized gas impervious envelope; and
    at least two diaphragms having opposed diaphragm outer edges connected to one another by opposed diaphragm inner edges, wherein said diaphragm outer edges are attached anywhere along said inner surface of said length orientation of said pressurized gas impervious envelope, and said diaphragm inner edges are attached to said partition inner edges, so as to form a plurality of lifting gas cells and an undivided air cell that spans the length orientation of said pressurized gas impervious envelope, and wherein said diaphragms are formed to traverse the distance defined by upper and lower extremities of said pressurized gas impervious envelope.

2. The airship according to claim 1, wherein said partition outer edge attachment extends below a vertical midpoint of said pressurized gas impervious envelope.

3. The airship according to claim 1, wherein said partition has a preformed concave first surface and a preformed convex second surface.

4. The airship according to claim 1, wherein said partition is flat.

5. The airship according to claim 1, wherein each said at least one partition is formed from gas impervious material.

6. A pressure-stabilized, non-rigid airship lacking an internal rigid framework comprising:
    a pressurized gas impervious envelope having an interior surface defined by a width orientation and a length orientation;
    at least one gas impervious semi-circular partition having a preformed concave first surface opposite a preformed convex second surface, said partition substantially vertically disposed within and attached to said pressurized gas impervious envelope, said semi-circular partition arranged to span a partial amount of said width orientation of said pressurized gas impervious envelope; and
    a diaphragm disposed on each side of said at least one semi-circular partition, said diaphragm having edges attached to said at least one semi-circular partition and to said interior surface, wherein said at least one semi-circular partition, said diaphragms and said interior surface define lifting gas cells, and wherein said diaphragm and said interior surface define an undivided air cell that spans the length orientation of said pressurized gas impervious envelope, wherein said diaphragm is formed to traverse the distance defined by upper and lower extremities of said pressurized gas impervious envelope.

7. The airship according to claim 6, wherein said at least one semi-circular partition has a semi-circular partition outer edge attached to said interior surface and a partition inner edge not attached to said interior.

8. The airship according to claim 7, wherein said interior has a vertical mid-point and wherein said at least one semi-circular partition is attached to said interior surface at least above said vertical mid-point.

9. The airship according to claim 8, wherein said diaphragm edges are attached to said partition inner edge adjacent thereto and to said interior surface.

10. A pressure-stabilized, non-rigid airship lacking an internal rigid framework comprising:
    a pressurized gas impervious envelope having a width orientation and a length orientation;
    at least one partition having a preformed concave first surface and a preformed convex second surface, said partition maintaining a partition outer edge attached anywhere along a portion of said width orientation, and a partition inner edge, such that said partition spans only a partial amount of the width orientation;
    at least two diaphragms having opposed diaphragm outer edges connected to one another by opposed diaphragm inner edges, wherein said diaphragm outer edges are attached anywhere along said length orientation, and said diaphragm inner edges are attached to said partition inner edges, so as to form a plurality of lifting gas cells and an undivided air cell that spans the length orientation of said pressurized gas impervious envelope, and wherein said diaphragm is formed to traverse the distance defined by upper and lower extremities of said pressurized gas impervious envelope.

11. The airship according to claim 10, wherein said partition outer edge attachment extends below a vertical midpoint of said envelope.

12. The airship according to claim 10, wherein each said at least one partition has a concave first surface and a convex second surface is semi-circular.

13. The airship according to claim 10, wherein each said at least one partition is formed from gas impervious material.

* * * * *

UNITED STATES PATENT AND TRADEMARK OFFICE
CERTIFICATE OF CORRECTION

PATENT NO.        : 7,500,637 B2
APPLICATION NO. : 11/241336
DATED             : March 10, 2009
INVENTOR(S)       : Marimon, Schmidt and Carter It is certified that error appears in the above-identified patent and that said Letters Patent is hereby corrected as shown below:

In Column 8, lines 2 to 3 (Claim 12, lines 2 - 3) the words "has a concave first surface and a convex second surface is semi-circular" should read --is semi-circular--.

Signed and Sealed this

Twelfth Day of May, 2009

JOHN DOLL
*Acting Director of the United States Patent and Trademark Office*